US008160222B2

(12) United States Patent
White et al.

(10) Patent No.: US 8,160,222 B2
(45) Date of Patent: Apr. 17, 2012

(54) ENHANCED CALLER ID WITH RECIPIENT-SELECTED CALLER INFORMATION DISPLAY

(75) Inventors: Scott White, Austin, TX (US); James Canaler, Jr., Pflugerville, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1213 days.

(21) Appl. No.: 11/186,622

(22) Filed: Jul. 21, 2005

(65) Prior Publication Data

US 2007/0036313 A1 Feb. 15, 2007

(51) Int. Cl.
*H04M 1/56* (2006.01)
*H04M 15/06* (2006.01)
*H04M 11/00* (2006.01)

(52) U.S. Cl. ............ 379/142.17; 379/142.06; 379/93.23
(58) Field of Classification Search ............. 379/142.01, 379/142.04, 142.06, 142.07, 142.09, 142.1, 379/142.17, 93.23, 207.15; 455/415
See application file for complete search history.

(56) References Cited

U.S. PATENT DOCUMENTS

| | | | | |
|---|---|---|---|---|
| 5,546,447 A * | 8/1996 | Skarbo et al. | ............ | 379/142.05 |
| 5,907,604 A * | 5/1999 | Hsu | ............ | 379/142.06 |
| 6,061,434 A * | 5/2000 | Corbett | ............ | 379/93.35 |
| 7,068,768 B2 * | 6/2006 | Barnes | ............ | 379/142.15 |
| 7,565,680 B1 * | 7/2009 | Asmussen | ............ | 725/135 |
| 7,660,404 B2 * | 2/2010 | Min et al. | ............ | 379/142.01 |
| 2003/0012353 A1 | 1/2003 | Tang et al. | | |
| 2003/0063732 A1 * | 4/2003 | Mcknight | ............ | 379/210.01 |
| 2004/0203835 A1 * | 10/2004 | Trottier et al. | ............ | 455/454 |
| 2004/0261115 A1 | 12/2004 | Bartfeld | | |

FOREIGN PATENT DOCUMENTS

GB 2 305 329 A 4/1997

OTHER PUBLICATIONS

Sonyericsson, "P900 Bedienungsanleitung", Aug. 2003, Retrieved from the Internet: http://www.t-mobile.de/downloads/bedie/nungsanleitungen/bedienung_p900_de.pdf.
International Search Report for International Application No. PCT/US 2006/028237, Mailed on Mar. 23, 2007.
Written Opinion of International Searching Authority for PCT/US 2006/028237, Mailed on Mar. 23, 2007.
Office Action for Canadian Patent Application No. 2,615,818 received from the Canadian Intellectual Property Office (CIPO) dated Nov. 25, 2009, 2 pages.
Disposition of the Oral Proceedings for European Application No. 06 788 016.1-2414 received from the European Patent Office (EPO) dated Mar. 4, 2010, 21 pages.
Summons to Attend Oral Proceedings for European Application No. 06 788 016.1-2414 received from the European Patent Office (EPO) dated Jul. 28, 2009, 6 pages.
SonyEricsson, "P900 Bedienungsanleitung," Aug. 2003, retrieved from the Internet: http://www.t-mobile.de/downloads/bedie/nungsanleitungen/bedienung_p900_de.pdf. 108 pages.

* cited by examiner

*Primary Examiner* — Quoc D Tran
(74) *Attorney, Agent, or Firm* — Toler Law Group, PC

(57) ABSTRACT

Enhanced caller ID display functionality is linked to Photo or image and/or address book or other database information elements associated with the caller by the call recipient to provide a richer Caller ID Display experience. The enhanced ID caller information is displayed on the call recipient's television via, for example, a television set-top box. Advantageously, the call recipient selects the information to associate with the caller. This is advantageous because it is the recipient that is in the best position to know which information, including which image or images, is most useful to the recipient in relation to the caller.

21 Claims, 5 Drawing Sheets

ENHANCED CALLER ID WITH RECIPIENT-SELECTED CALLER INFORMATION DISPLAY

CROSS-REFERENCE TO RELATED APPLICATIONS

Not Applicable.

FIELD OF THE INVENTION

The present invention relates to telecommunications, and in particular to systems, methods and media for enhanced caller ID information.

BACKGROUND OF THE INVENTION

Some Digital Video Recorders (DVRs, also known as Personal Video Recorders or PVRs), Satellite/Cable Receivers and other types of television Set-Top Boxes (STBs) include Caller ID Display functionality, where the phone number and name associated with an incoming phone call is displayed on the television screen.

Published United States patent application No. 20030012353 A1 by Tang, et al., filed Jul. 9, 2001, and entitled PHOTO CALLER ID, describes a system and method for providing a photo enhanced caller ID service where a photo image associated with a subscriber is stored at a central office and transmitted with a telephone call and is displayed on the television screen of the recipient of the incoming call. Alternatively, the image is displayed on a screen of the recipient's telephone set. Tang, at el., however, do not describe a system whereby the recipient selects, or pre-selects, the image associated with the caller together with, or alternatively, select personal information of the caller such as spouse's name, children's names, birthdays, business address and telephone, email addresses and so forth. Tang, et al., further do not describe a solution where the enhanced caller ID information is stored on the recipient's set-top box.

BRIEF DESCRIPTION OF THE DRAWINGS

The present invention is further described in the detailed description that follows, by reference to the noted drawings, by way of non-limiting examples of embodiments of the present invention, in which reference numerals represent the same parts throughout the several views of the drawings, and in which.

DETAILED DESCRIPTION OF THE INVENTION

Figure 1:
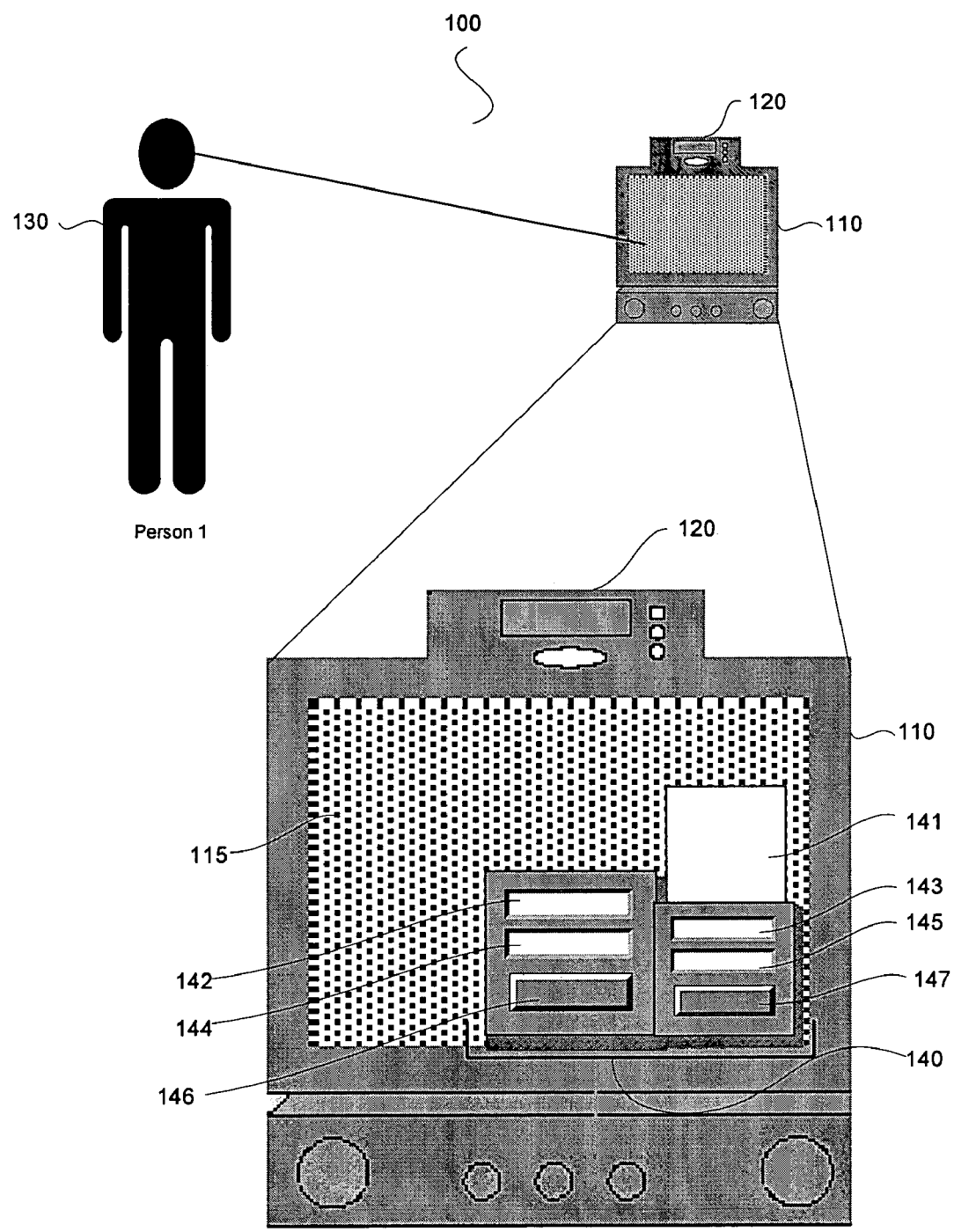
FIG. 1 is a schematic drawing of a specific exemplary embodiment of an enhanced caller ID solution of the present invention.

In view of the foregoing, the present invention, through one or more of its various aspects, embodiments and/or specific features or sub-components, is thus intended to bring out one or more of the advantages that will be evident from the description. The present invention is described with frequent reference to television set-top boxes. It is understood, however, that a set-top box is merely an example of a specific embodiment of the present invention, which is directed broadly to networked interactive television within the scope of the invention. The terminology, examples, drawings and embodiments, therefore, are not intended to limit the scope of the invention.

Some DVRs, Satellite/Cable Receivers and other types of STBs currently include Caller ID Display functionality that allow the phone number and name associated with an incoming phone call to display on the television screen. The next generation of STBs, however, will include storage and access capabilities for media beyond standard television content. Storage and access features may also be available with game consoles connected to the television, particularly those consoles that provide online, multiplayer, capabilities over a network. In fact, the term STB is considered, for the purposes of this disclosure, to include such consoles.

The media includes storage of and access to a user's digital photo collection and address book. The storage may be local, i.e., stored on the STB's hard drive, or remote, i.e., stored on a network resource such as a server.

The present invention provides solutions for linking Caller ID Display functionality with Photo and/or Address Book or other database information elements, resulting in a richer STB Caller ID Display experience. An advantage of the present invention is that the call recipient selects the information to associate with the caller. This is advantageous because it is the recipient that is in the best position to know which information, including which image or images, is most useful to the recipient in relation to the caller.

For instance, were the caller to select an image of him or herself for caller ID display, he or she might select an outdated, unrecognizable, image that does not, in fact, inform the recipient of who is calling. The recipient may not even be able to discern the gender or age of the caller. When, however, the recipient is able to select an image, for example, even household children who cannot read caller ID information in a text display would be able to recognize the caller because the image would be an image that the child is most likely familiar with, since the image was selected by the family rather than by the caller.

Additionally, caller selected images may be inappropriate for viewing by all household members of the recipient, yet the recipient is unable to prescreen the image before it is displayed. This may be a particular problem when the caller ID image is displayed on the family television screen during family television viewing. The present invention provides a solution to these and other problems of enhanced caller ID, including an easy to use interface that allows the recipient to control what is displayed on their television screen.

FIG. 1 is a schematic drawing of a specific exemplary embodiment of an enhanced caller ID solution of the present invention. Television 110 is connected to set-top box or other device 120 which in turn is connected to a telecommunications network (not shown). Person 130 is watching television 110 when an incoming phone call arrives. STB 120 alerts person 130 of the incoming call and displays caller ID information 140 on television screen 115. Basic caller ID information may be displayed from the standard caller ID service to which person 130 subscribes through his or her telephone service provider.

Display 140 includes photo display inset 141, caller ID text information boxes 142, 143, 144, and 145. Boxes 142 through 145 include, for example, caller first name (142) caller last name (143), caller phone number (144) and additional information (145) such as caller email address. Edit function buttons 146 and 147 are also displayed and are managed used the set-top box remote (not shown) or manually using manual function control buttons (not shown) provided on the set-top box housing.

Any customized caller ID information (beyond basic information provided by the service provider) is obtained from the set-top box, or other device, storage media using the caller ID information from the service provider to map information pre-selected by person 130 and associated with the caller to display in enhanced display 140.

In the event that person 130 has not pre-selected information associated with the caller, person 130 may use edit functions accessed by button 146 to pull up a menu on screen 115 that allows person 130 to navigate through one or more databases accessible by storage media device 120, such as a set-top box or game console, to add select information about the caller to the various fields 142-145 of display 140. Of course, it is understood that fields 142-145 are purely illustrative in content and number, and that embodiments of the present invention provide more or fewer information fields, and the amount of information contained in each field, to which person 130 may add as much or as little information about the caller as desired. Certain embodiments provide for person 130 to add or delete fields, or change the amount of information in each field, as desired within the resolution and space constraints of screen 115. Button 147 provides, for example, a cancel function to clear the caller ID display from the display screen.

Additionally, television 110 continues to display the programming being viewed prior to the incoming call by virtue of picture-in-picture capability, or other analogous technology, supported by STB 120 or television 110 for uninterrupted viewing during the phone call.

Figure 2:
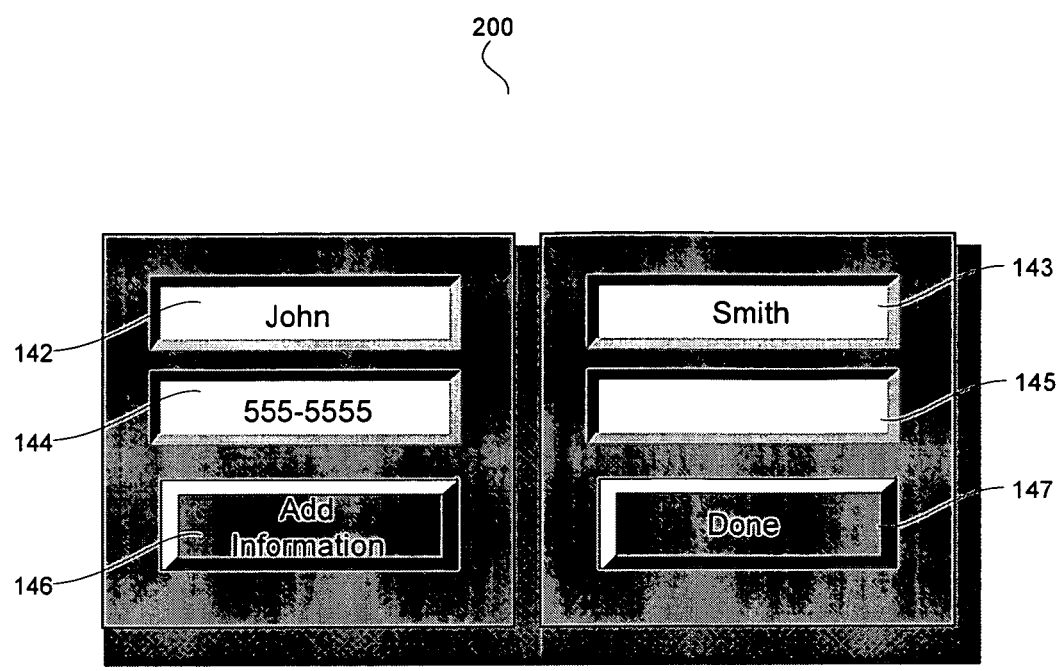
FIG. 2 is a schematic drawing of a detail of a caller ID display of FIG. 1.

FIG. 2 is a schematic drawing of a detail of a caller ID display of FIG. 1. Display 140 provides text information fields that show, for example, the caller's first name 142, last name 143, telephone number 144, and additional information 145, such as the name of the caller's spouse. Optionally selectable Edit button 146 provides edit capability to edit the information, including but not limited to an image, to be displayed. Button 146 opens a menu (not shown) to access additional information to include in display 140. Save functions (not shown) allow the call recipient to save edited information in storage media device 120 after editing the information and the menu is closed. Optionally selectable Cancel button 147 clears display 140 from the TV screen.

Figure 3:
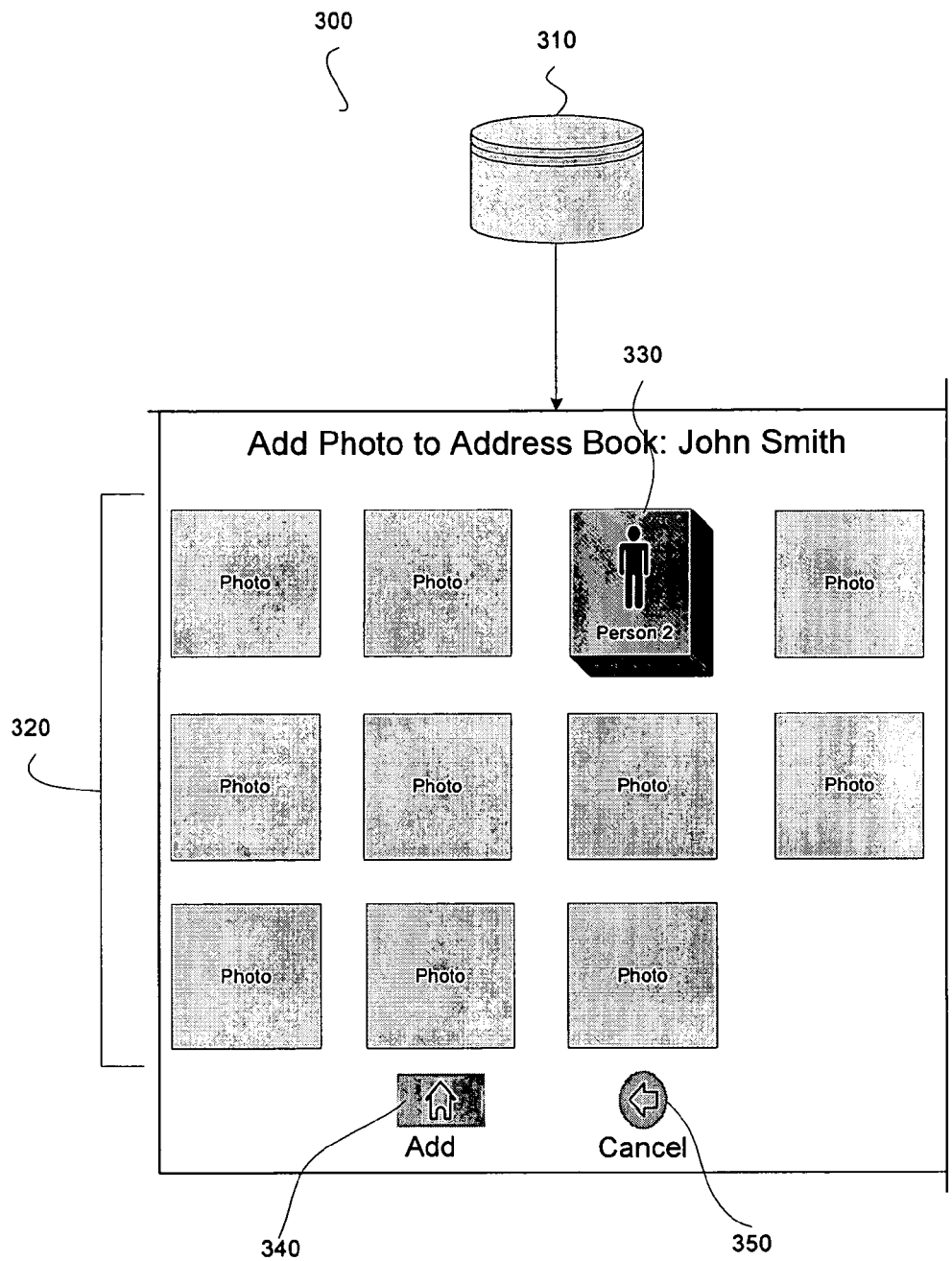
FIG. 3 is a schematic drawing of an exemplary image database for selecting an image for display in an exemplary embodiment of an enhanced Caller ID system of the present invention.

FIG. 3 is a schematic drawing of an exemplary image database for selecting an image for display in an exemplary embodiment of an enhanced Caller ID system of the present invention. Database 130 provides a variety of images 320 that a user can select for display. Images 320 may be provided from a variety of sources, such as an electronic address book, a digital camera, a camera phone, a hard drive, a floppy disk or CD-ROM or other electronic storage medium, a PDA (including BlackBerry™-type devices), an email attachment, a network server, an online source, the world wide web, or any source for an electronic image within the constraints of space and resolution of the invention.

Database 310 is accessed by activating optionally selectable Edit button 146 from display 140 and navigating through the accessible databases to bring up an image database. An image 330 is selected by a user and added to display 140 in field 141 by activating Add button 340. Database display 310 is closed by activating Cancel button 350 to exit without editing or without saving any edit.

Figure 4:
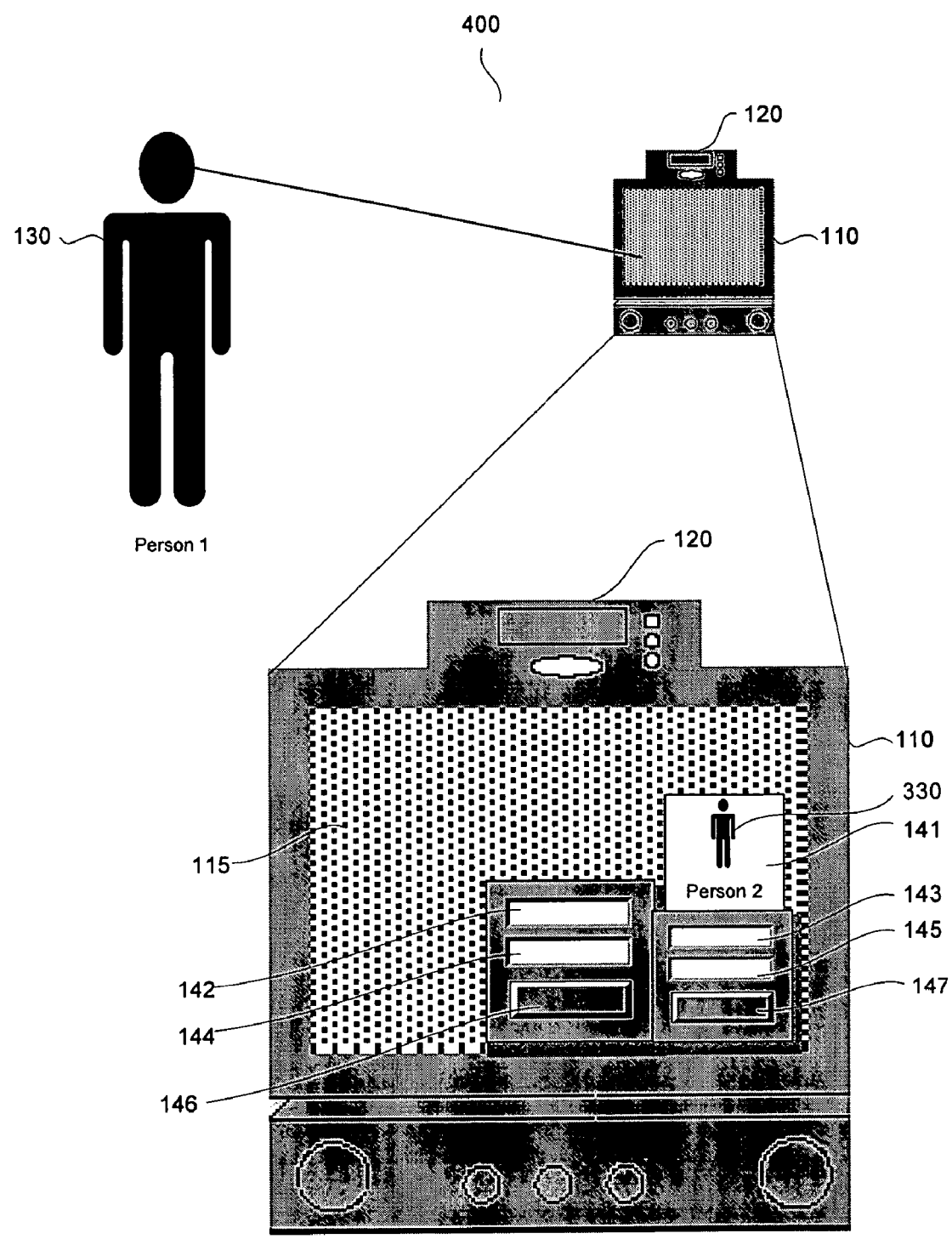
FIG. 4 is a schematic drawing of a specific exemplary embodiment of an enhanced caller ID solution of FIG. 1 showing a call recipient-selected image associated with the caller in a display field of the invention.

FIG. 4 is a schematic drawing of a specific exemplary embodiment of an enhanced caller ID solution of FIG. 1 showing a call recipient-selected image associated with the caller in a display field of the invention. Display field 141 contains image 330, which was either pre-selected by the call recipient or was selected using the edit function of display 140 when display 140 was presented in connection with an incoming call from the caller.

In addition to image or photo display, the present invention further provides embodiments that allow the user to display a wide variety of personal information about the caller. Edit function 146 provides access to any data accessible through an electronic database and allows the call recipient to associate such data with the caller's Caller ID for display on a caller ID display screen. Caller personal information, for the purposes of this disclosure includes, but is not limited to, the name of the caller's spouse, the genders and names of the caller's children, the caller's email address, the caller's business contact information, the caller's residential or business address, the species and names of the caller's pets, the caller's website URL, the caller's relationship to the call recipient (such as familial relationship, if any), and the caller's gender and marital status.

In additional to television screen display, the present invention contemplates enhanced caller ID display on a display screen of a communications terminal such as a cell phone, a Personal Digital Assistant (PDA) including BlackBerry®-type devices, a personal computer, a Voice over Internet Protocol (VoIP) terminal, an Internet Protocol Television (IPTV), and so forth.

Figure 5:
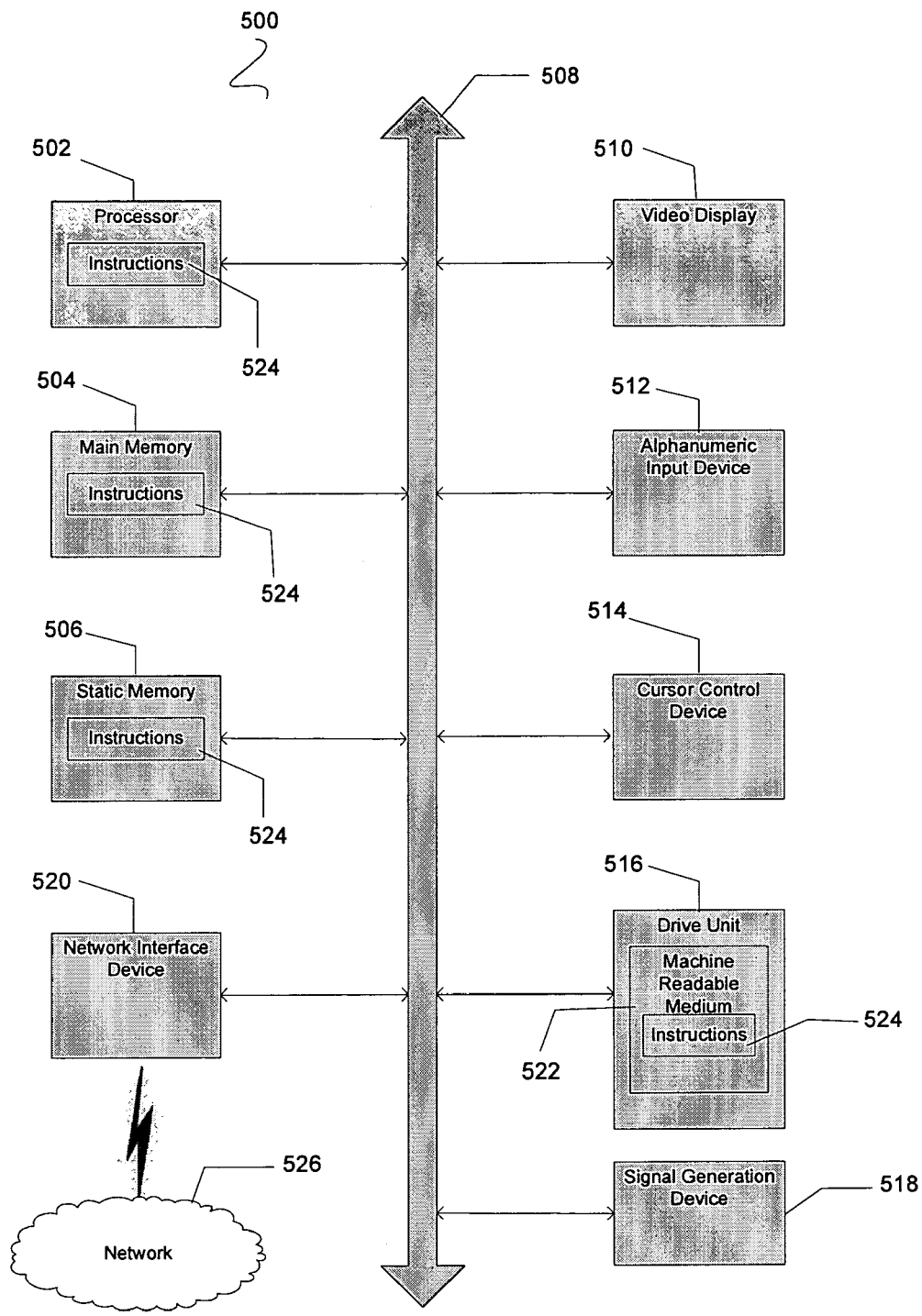
FIG. 5 is a diagrammatic representation of a machine in the form of a computer system within which a set of instructions, when executed, may cause the machine to perform any one or more of the methodologies of the present invention.

FIG. 5 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein., The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 524 so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the invention is considered to include any one or more of a machine-readable medium as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. The invention is considered to include a tangible storage medium as listed herein and including art-recognized equivalents and successor media, in which the software implementations herein are stored.

Accordingly, those skilled in the art will recognize that the present invention extends to machine-readable media ("MRM") contain instructions for execution by a programmable machine such as a computer. MRM is broadly defined to include any kind of computer memory such as floppy disks, conventional hard disks, CD-ROMs, Flash ROMs, nonvolatile ROM, RAM, Storage Media, solid state media, and magnetic media, together with processors to execute the instructions.

The invention has been described with reference to several exemplary embodiments. It is understood, however, that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

We claim:

1. A machine-readable medium having instructions stored thereon that, when executed by a machine, cause the machine to:
   receive an incoming call from a caller at a first device, wherein first caller identification information is received at the first device with the incoming call;
   determine whether second caller identification information is available at the first device based on the first caller identification information, wherein the second caller identification information is different from the first caller identification information, wherein the second caller identification information is stored at the first device prior to receiving the incoming call, and wherein the second caller identification information includes an image;
   in response to determining that the second caller identification information is available at the first device, retrieve the second caller identification information;
   present a graphical display at a display device coupled to the first device, the graphical display including:
      a plurality of caller information fields, wherein a first set of caller information fields of the plurality of caller information fields is populated based on the first caller identification information, and wherein a second set of caller information fields of the plurality of caller information fields is populated based on the second caller identification information;
      a user selectable edit option to edit the second caller identification information during the incoming call; and
      a cancel button to remove the graphical display from the display device; and
   in response to a selection of the user selectable edit option during the incoming call, modify the second caller identification information, wherein modifying the second caller identification information includes:
      selecting a second image from a plurality of images stored at a second device, wherein the plurality of images are stored in a photo book, a database, an address book, or any combination thereof, and wherein the second image is associated with the caller.

2. The machine-readable medium of claim 1, wherein the first device is a set-top box device and the display device is a television screen, and wherein the graphical display is presented at a first window at the television screen via a picture in picture capability of the set-top box device without interrupting presentation of content displayed at the television screen when the incoming call is received.

3. The machine-readable medium of claim 1, wherein the first device is a communication device and the display device is a display screen of the communication device.

4. The machine-readable medium of claim 1, wherein modifying the second caller identification information further includes selecting a user-defined set of caller information fields from the plurality of caller information fields, and wherein the instructions further cause the machine to update the graphical display to present the user-defined set of caller information fields.

5. The machine-readable medium of clam 4, wherein the second caller identification information includes an image that is selected by a recipient of the incoming telephone call prior to the first device receiving the incoming telephone call.

6. The machine-readable medium of claim 1, wherein the first device is a communication device, and wherein the second device is one of a set-top box device, a wireless communication device a personal digital assistant a personal computer, a voice over internet protocol terminal, a game console, an electronic address book, a digital camera, a hard drive, a floppy disk, a compact disc, a network server, and an internet protocol television.

7. The machine-readable medium of claim 1, wherein the first device is a set-top box device, wherein the second device is a personal computing device, and wherein selecting the second image of the plurality of images stored at the second device includes selecting an image stored as an email attachment at the second device.

8. The machine-readable medium of claim 1, wherein the second caller identification information includes a name of a spouse of the caller, one or more names associated with children of the caller, a birthday of the caller, a birthday of the spouse of the caller, a birthday of the one or more children of the caller, a business address of the caller, an email address of the caller, a residential address of the caller, a name of one or more pets of the caller, a species of the one or more pets of the caller, a website associated with the caller, a relationship between the caller and a recipient of the incoming telephone call, a gender of the caller, a marital status of the caller, an image of the caller, or any combination thereof.

9. The machine-readable medium of claim 1, wherein the second caller identification information is preselected by a first member of a family associated with the first device and the second device, wherein a recipient of the incoming telephone call is a second member of the family, and wherein the second caller identification information is modified by the second member of the family during the incoming telephone call in response to the selection of the user selectable edit option.

10. The machine-readable medium of clam 9, wherein determining whether the second caller identification information is available includes mapping first data included in the first caller identification information to second data included in the second caller identification information.

11. The machine-readable medium of claim 1, wherein the user selectable edit option further enables a recipient of the incoming call to configure the graphical display to display a first portion of information associated with a first caller information field of the plurality of caller information fields and to not display a second portion of the information associated with the first caller information field.

12. A method comprising:
accessing, from a first device, a first plurality of images stored at a second device by a user associated with the first device and the second device;
selecting a first image of the plurality of images;
associating the first image with user-defined caller identification information associated with a caller, wherein the user-defined caller identification information includes a plurality of caller identification items, wherein the first image is associated with a first caller identification item, and wherein one or more additional caller identification items of the plurality of caller identification items are associated with personal information associated with the caller;
storing the user-defined caller identification information at the first device;
receiving an incoming telephone call from the caller at the first device, wherein first caller identification information is received at the first device with the incoming telephone call;
retrieving the user-defined caller identification information stored at the first device based on a mapping of the first caller identification information to at least one of the plurality of caller identification items included in the user-defined caller identification information;
presenting a graphical display overlaying television content displayed at a display device coupled to the first device, the graphical display including:
a plurality of caller information fields, wherein a first set of caller information fields of the plurality of caller information fields is populated based on the first caller identification information, and wherein a second set of caller information fields of the plurality of caller information fields is populated based on the user-defined caller identification information;
a user selectable edit option to edit the user-defined caller identification information during the incoming telephone call;
a cancel button to remove the graphical display; and
in response to a selection of the user selectable edit option during the incoming telephone call, modifying the user-defined caller identification information, wherein modifying the user-defined caller identification information includes:
accessing a second plurality of images stored at a third device in a photo book, a database, an address book, or any combination thereof;
selecting a second image from the second plurality of images stored at the third device, wherein the second image is associated with the caller;
replacing the first image associated with the user-defined caller identification information with the second image to produce modified user-defined caller identification information;
storing the modified user-defined caller identification information at the first device; and
updating the second set of caller information fields displayed at the graphical display based on the modified user-defined caller identification information.

13. The method of claim 12, wherein modifying the user-defined caller identification information further includes selecting a subset of caller information fields to be displayed at the graphical display, wherein the subset of caller information fields is selected from the second set of caller information fields, and wherein each field of the second set of caller information fields is associated with a particular caller identification item.

14. The method of claim 13, wherein the subset of caller information fields indicates that a first caller information field of the second set of caller information fields is displayed at the graphical display and a second caller information field of the second set of caller information fields is not displayed at the graphical display.

15. A system comprising:
a set-top box device including:
a database of user-defined caller information, wherein the user-defined caller information includes a plurality of images, and wherein at least one of the plurality of images is associated with a caller;
a video display output to send caller information associated with the caller to a television display coupled to the set-top box device in response to receiving an incoming telephone call from the caller; and
instructions executable by the set-top box device to:
send a user interface to the television display via the video display output in response to receiving the incoming telephone call, wherein the user interface is configured to populate a plurality of caller information fields based on caller identification information received with the incoming telephone call and based on the user-defined caller information, wherein the user interface includes a user selectable edit option that enables a recipient of the incoming telephone call to edit the user-defined caller information during the incoming telephone call; and
in response to a selection of the user selectable edit option during the incoming telephone call:
access a second plurality of images;
select an image from among the second plurality of images;
associate the selected image with the caller; and
store the selected image in the database.

16. The system of claim 15, wherein the user-defined caller information includes personal information associated with the caller.

17. The system of claim 15, wherein the user-defined caller information includes personal information associated with the caller, and wherein the user interface is configured to display a first portion of the personal information and to not display a second portion of the personal information.

18. The system of claim 17, wherein the first portion of the personal information and the second portion of the personal information are determined based on a configuration of the user-defined caller information in response to the selection of the user selectable edit option.

19. The system of claim 15, wherein the second plurality of images are stored in a second device that is one of a wireless communication device, a personal digital assistant, a personal computing device, a game console, a digital camera, and a hard drive.

20. The system of claim 15, wherein the second plurality of images are stored in a personal computing device, and wherein the image is selected from an email attachment.

21. The system of claim 15, wherein the instructions are further executable by the set-top box device to display the user interface in a window at the television display via a picture-in-picture capability of the set-top box device.

* * * * *